June 30, 1931.  E. H. RYERSON  1,812,062

KITCHEN UTENSIL

Filed Aug. 22, 1929

Inventor
Eugene H. Ryerson
By Attorneys
Southgate Fay & Hawley

Patented June 30, 1931

1,812,062

UNITED STATES PATENT OFFICE

EUGENE H. RYERSON, OF WORCESTER, MASSACHUSETTS

KITCHEN UTENSIL

Application filed August 22, 1929. Serial No. 387,742.

This invention relates to a kitchen utensil adapted particularly for use as a grater for vegetables, fruit, or any soft substance, but also capable of use as a toaster, cake-cooler, or flat-iron stand.

The principal objects of this invention are to provide a grater formed in a simple and inexpensive manner, and constructed of a material of extremely low-price; also to provide a grater which will have a series of comparatively long cutting surfaces arranged at an angle to the plane of the article so as to cut in on an incline; to provide a support for it of such a nature as to adapt the grater to be used as a cake-cooler, flat-iron support or toaster; and to provide the grater in such form that it will have wide spaces between the cutting edges which in itself also adapts it for use to advantage as a toaster.

Other objects and advantages of the invention will appear hereinafter.

Reference is to be had to the accompanying drawings, in which

Figure 2:
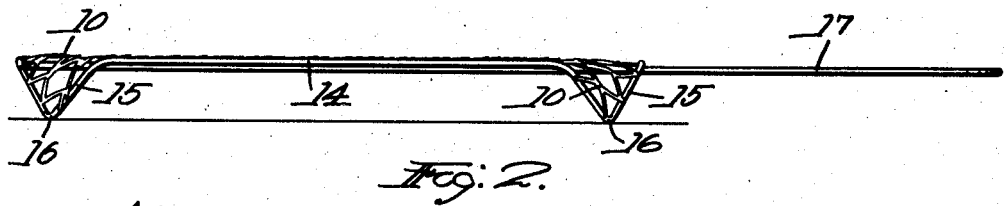
Fig. 2 is a side view of the same.
Figure 3:
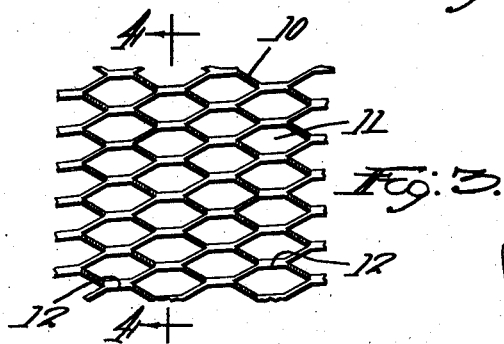
Fig. 3 is a plan on enlarged scale of a portion of the grater showing the details thereof.
Figure 4:
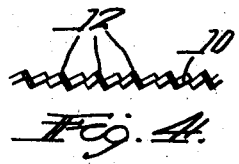
Fig. 4 is a sectional view on the line 4—4 of Fig. 3.

Graters constructed in accordance with the general principles of this invention can be made in many forms, two of which are shown herein. In the first and preferred form shown, that illustrated in Figs. 1, 2, 3 and 4, the grater consists of a flat sheet of expanded metal preferably steel 10. If made of steel the expanded metal is galvanized or otherwise coated with a non-rusting material. The expanded metal itself has the usual characteristics of expanded metal, and as shown in Figs. 3 and 4 it involves a piece of metal having alternate slits in two series of rows which, when expanded, leave hexagonal openings 11 through the body of the material. At opposite sides of these openings are bodies of sheet metal located at an incline to form cutting edges 12. These cutting edges are located on both sides of the grater and are also located at an inclination. They are spaced apart a material distance, Fig. 3 indicating one size in full-sized construction. These cutting edges are so located with relation to each other that when a vegetable or the like is brushed across the surface it will come into contact with these cutting edges 12 rapidly and the openings 11 afford ample spaces through which the material grated up in this way can be discharged below.

As so far described, this device is reversible and will work one side up as well as the other. It is strong and durable, and there is practically no danger of the material of the grater wearing out until after a great many years of use.

The above description indicates the grater generically. In the preferred form shown in Figs. 1 and 2, a flat piece of this expanded metal 10 is welded or soldered to a surrounding frame 14, preferably of wire, and also galvanized. The galvanizing can be done after the entire article is completed. This frame can be left flat for the use of the device as a grater, but I prefer to bend over the four corners to form legs 15. These, of course, are all bent over to the same degree, and the extreme corners 16 are naturally rounded, because the wire 14 of which the frame is formed, is rounded naturally at each corner when originally constructed. These round corners constitute feet for supporting it on a table and are not likely to mar any surface on which it is placed.

Figure 1:
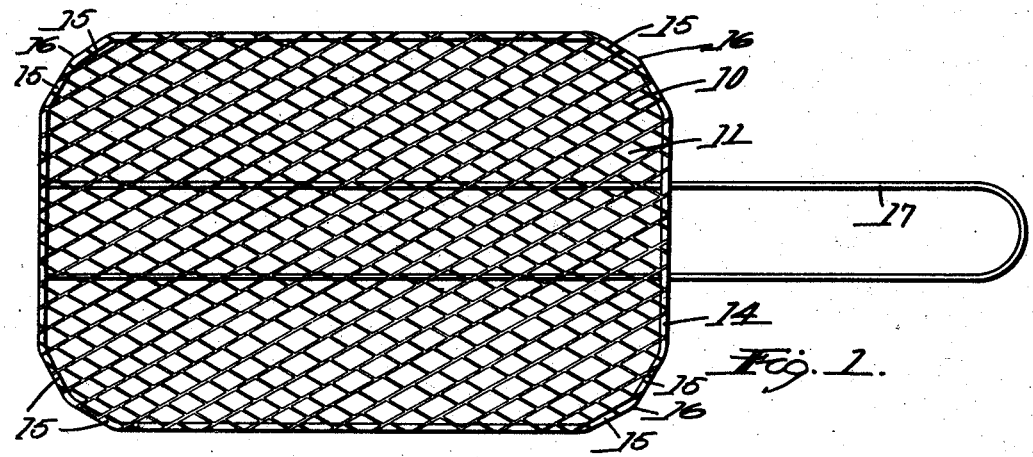
Fig. 1 is a plan of a grater constructed in accordance with this invention.

This article is completed by the application to it of a handle 17. It is shown in Figs. 1 and 2 as formed of a single piece of wire bent over to provide two strands separated from each other and furnishing a smooth end for the handle, and it is passed under the frame and soldered or welded to it in four places under the wire 14.

This constitutes a very strong and durable grater. The handle can be used to hold it and allows for all the desired manipulations.

In ordinary use the handle can be held in one hand and the vegetable or other article moved across the surface of the expanded metal by the other, but it is convenient to place it on top of a bowl or plate with the legs 15 extending beyond the rim thereof, so that the particles removed by the grater will fall down into the receptacle below. But the legs can be placed on a table and the grater will assume a horizontal position in which it can be used in a similar way.

It will also be obvious that this constitutes a very good toaster, because the spaces between the parts of the expanded metal furnish ample air space and allow the heat to pass through, and any slight smoke that might be produced can escape. On account of substantially the same features it serves readily as a cake-cooler, or as a flat-iron support. The four legs at the corners are very strong, and it can be used for this purpose without any real danger of injuring it for any of the other purposes mentioned.

Figure 6:
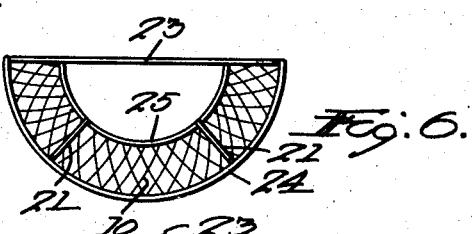
Fig. 6 is a plan of the same.
Figure 5:
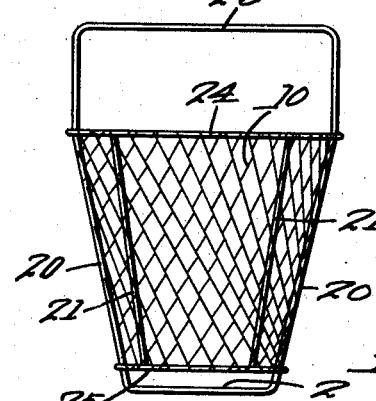
Fig. 5 is a front elevation of a grater constructed according to this invention, but in a different form.
Figure 7:
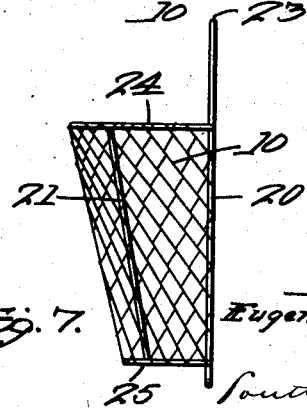
Fig. 7 is an edge view thereof.

In the form shown in Figs. 5, 6 and 7, similar principles are involved. The piece of expanded metal is placed on a frame composed of upright wires 20 and 21, two of each being employed, the wires 20 being part of a continuous wire around the back of the article in a single plane. They are connected across the top by an integral wire 23 which constitutes the handle. A top wire 24, semi-circular in the present form, and a similar bottom wire 25 complete the wire frame. These wires are soldered or welded together at the proper points.

Surrounding the whole frame, which is in the form of a half frustum of a cone, is placed a sheet of expanded metal bent into semi-conical shape at all points and welded to the wires 20, 24 and 25 preferably. It is not necessary to weld it to the wires 21. This device can hang up on the wall without taking up much space, and it can be manipulated by the handle 23 and placed over a bowl or the like, and the vegetable to be grated moved across its front face. The particles removed will fall down through the small space below, and it serves its purpose as a grater equally well as the one illustrated in Figs. 1 and 2. The same features of construction of the expanded metal serve the same purpose here. This article can be used to some extent as a container when hung up by its handle 23.

Although I have illustrated and described only two forms of the invention and mentioned only a few of the purposes for which it is useful, I am aware of the fact that the invention can be carried out in other ways without departing from the scope of the invention as expressed in the claims. Therefore I do not wish to be limited to the exact forms shown, but what I do claim is:—

1. As an article of manufacture, a kitchen utensil of the character described, comprising a frame having sides and ends in the same plane, and a piece of expanded metal welded at its edges to said frame and lying in a plane, said frame and expanded metal being bent down at intervals to form supporting legs.

2. As an article of manufacture, a kitchen utensil, comprising a rectangular frame having sides and ends in the same plane, and a piece of expanded metal welded at its edges to said frame and lying in a plane for use as a grater, the corners of said frame being bent out of the plane thereof to constitute legs for supporting the frame on a flat surface, so that it will be suitable for use as a supporting device as well as a grater.

In testimony whereof I have hereunto affixed my signature.

EUGENE H. RYERSON.